(No Model.) 3 Sheets—Sheet 1.

F. F. LANDIS.
TRACTION WHEEL.

No. 325,750. Patented Sept. 8, 1885.

WITNESSES
L. C. Hills
Wm. S. Duvall

INVENTOR
Frank F. Landis
by E. E. Masson
Attorney (No Model.)　3 Sheets—Sheet 2.

F. F. LANDIS.
TRACTION WHEEL.

No. 325,750.　　　　Patented Sept. 8, 1885.

WITNESSES:
L. C. Hills
Wm. Duvall

INVENTOR
Frank F. Landis,
by E. E. Masson
Attorney (No Model.)
F. F. LANDIS.
TRACTION WHEEL.
No. 325,750.　　　　　　　　　Patented Sept. 8, 1885.
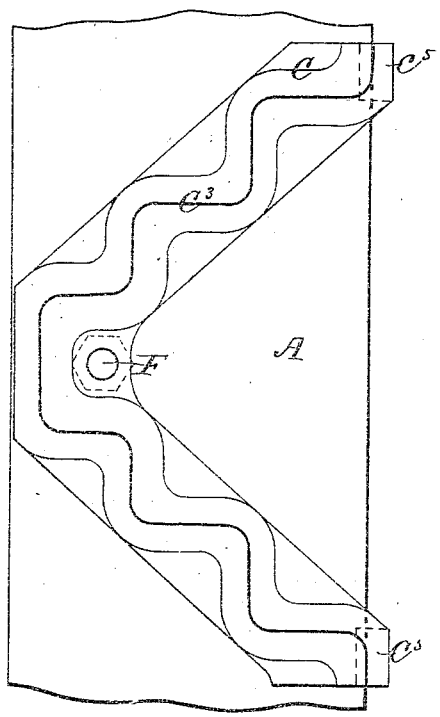
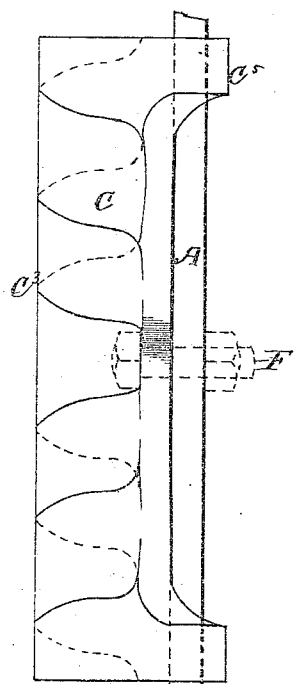
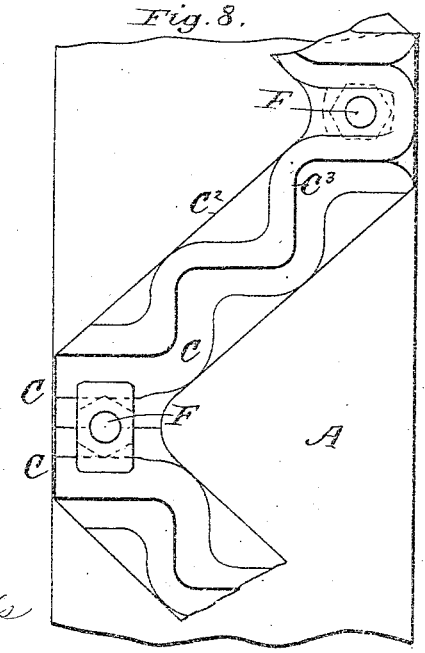
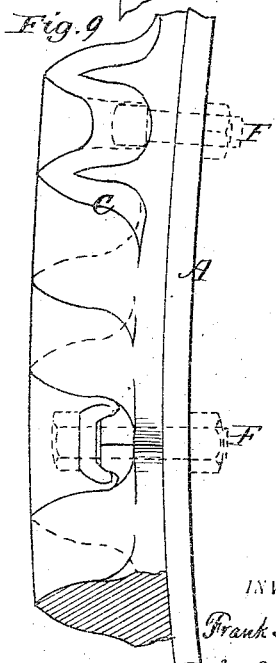
WITNESSES:
INVENTOR
Frank F. Landis
by E. E. Masson
Attorney

UNITED STATES PATENT OFFICE.

FRANK F. LANDIS, OF WAYNESBOROUGH, PENNSYLVANIA.

TRACTION-WHEEL.

SPECIFICATION forming part of Letters Patent No. 326,750, dated September 8, 1885.

Application filed June 4, 1884. (No model.)

*To all whom it may concern:*

Be it known that I, FRANK F. LANDIS, a citizen of the United States, residing at Waynesborough, in the county of Franklin and State of Pennsylvania, have invented certain new and useful improvements in Tire-Attachments for Traction-Engines, of which the following is a specification, reference being had therein to the accompanying drawings.

This invention has relation to a novel construction of devices intended for attachment to the tires of wheels of traction-engines, for the purpose of rendering them capable of taking firm hold upon the ground, whereby slipping of the wheels is prevented.

The invention consists in certain novel features hereinafter described, and specifically set forth in the claims.

Figure 1:
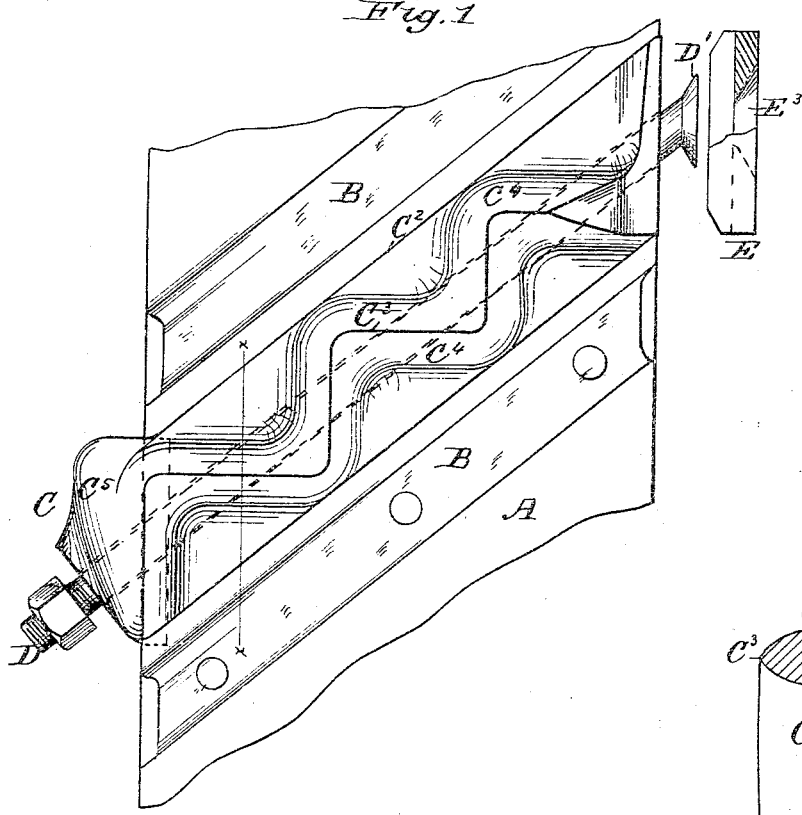
Figure 3:
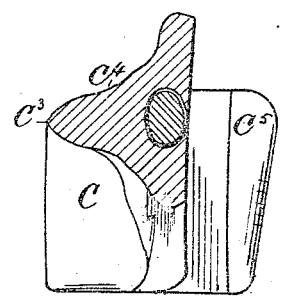
Figure 2:
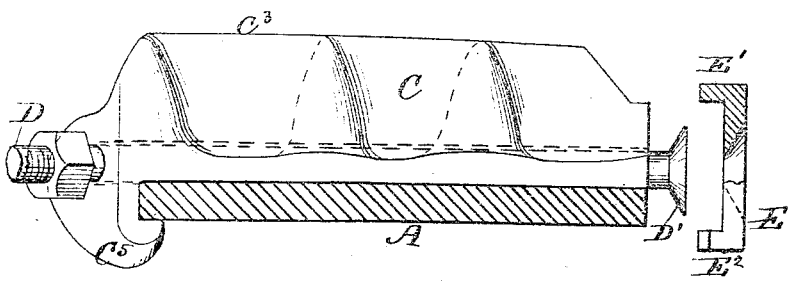

Referring to the drawings, Figure 1 is a plan of a portion of a tire provided with my novel traction-ribs. Fig. 2 is a section of the tire, showing the rib in side elevation; and Fig. 3 is a vertical section of the rib, taken on line $x x$ of Fig. 1. Figs. 4 and 5, 6 and 7, and 8 and 9 are plan and side elevations, respectively, of modifications of my invention.

Like letters indicate like parts in all the figures.

A represents an ordinary smooth tire, to which, in one instance, I secure cleats B, extending diagonally across the face of the tire and parallel to each other. Between these cleats I secure what I herein designate as my "improved traction-rib" C, which is formed of a casting comprising a base having two straight edges, C', and a central zigzag or stepped edge, C², forming the top of a waved or otherwise disposed upwardly-projecting rib or corrugation, C. This casting is perforated longitudinally under the stepped edge, so that when placed as shown in Fig. 1, a bolt, D, may be passed therethrough to secure the ribs to the tire.

Figure 4:
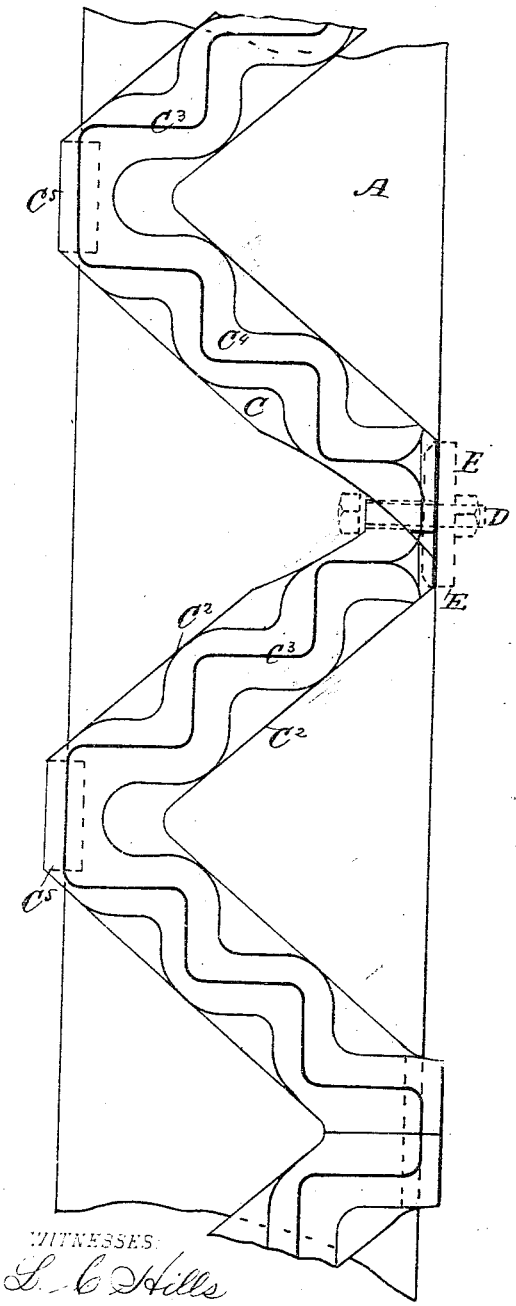
Figure 5:
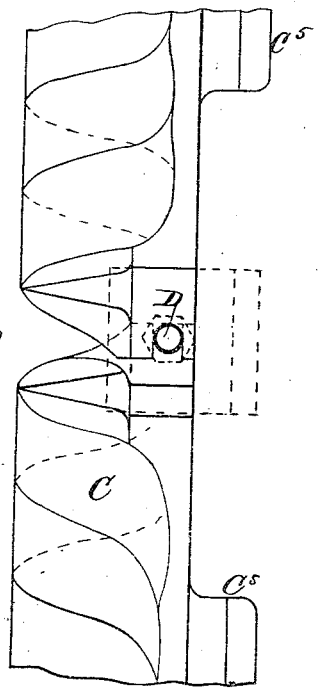

E is a clamp adapted to fit against the ends of the rib-sections, and provided with an upper and a lower flange, E' E², respectively, the former adapted to project over and rest upon the rib-sections and the latter to project under the tire A. The clamp is provided with the seat E³ for the head D' of the bolt D. One end of the ribs C is made to project, as at C³, beyond and beneath the tire, as clearly shown in Figs. 2, 3, 5, 6, and 7, so that after being placed within the cleats B tightening the nut D² on the bolt D draws the clamp E and the projection C³ snugly against the edges of the tire. The ribs may also be made integral with the tire. It will be seen that the strain upon the rib, coming in the circumferential line parallel with the edges of the tire, would, without the stepped division of the rib shown in this construction, have a tendency to force the wheels laterally, particularly upon slippery ground, and push the rib laterally along the line of the cleats, bringing the strain entirely upon the bolt; but with such stepped division the strain upon the rib is diversified and distributed, and thereby reduced upon the cleats and upon the bolt, so that the structure as a whole is rendered very strong and not liable to slide laterally upon ice, mud, or while drawing a gang-plow. Now, it is not absolutely necessary that the cleats B be employed, or that the traction ribs should all be parallel with each other; but they may be arranged to alternately cross the tire diagonally in opposite directions, as shown in Figs. 4, 5, and 6, in which cases the side cleats, E, are used at the one or both sides of the tire, and when at one edge only the extension C³ may be formed upon one of the rib-sections. These rib-sections may be made V-shaped and of a length to cross and recross the tire, or of a length merely to cross it, as in the instance illustrated in Figs. 1 and 8, and with or without side cleats upon both edges of the tire. I may use bolts F passing vertically through a rib-section and the tire, and when each casting or section C' crosses and recrosses the tire I may employ shorter bolts D, (see Fig. 4,) or vertical bolts F and clamp F' (see Figs. 8 and 9) to bind the sections together and to the tire. In these modifications I still retain the advantages of the zigzag or stepped rib-sections, which overcome the tendency of the ribs to be forced sidewise upon the tire and upon the ground. The projecting portion C³ of the rib-section is nearly similar in form to the cogs of gear-wheels, so that while the traction-wheels travel upon soft roads or fields they will have no tendency to lift the soil and become loaded with adhesive clayed ground.

Having described my invention and its operation, what I claim, and desire to secure by Letters Patent, is—

1. A traction-rib for wheels of traction-engines provided with zigzag steps, having one edge of said steps formed parallel with the end of said rib and the other edge perpendicular to the first-stated edge, substantially as specified.

2. A traction-rib having a corrugation of steps or zigzag outline arranged diagonally across the tire, substantially as specified.

3. A traction-rib provided with zigzag steps, having one edge of said steps formed parallel with the end of said rib, and an extension at said end adapted to embrace the edge of the tire, substantially as described.

4. The combination of a tire, an edge clamp, and bolt, with traction-ribs arranged diagonally thereon and provided with zigzag steps, having one edge of said steps formed parallel with the edge of said tire, substantially as and for the purpose described.

5. The combination of the tire A, the rib-section C, having the zigzag or stepped rib $C^4$, a side cleat or cleats, B, and a bolt, D, substantially as shown and described.

6. The combination of the tire A, the cleats B, the zigzag rib-section C', cleat E, and bolt D, substantially as shown and described.

In testimony whereof I affix my signature in presence of two witnesses.

FRANK F. LANDIS.

Witnesses:
D. M. GOOD, Jr.,
D. C. UNGER.